R. HUMPHRIES.
FLY WHEEL.
APPLICATION FILED AUG. 7, 1917.

1,254,694.

Patented Jan. 29, 1918.

INVENTOR
Ralph Humphries.
BY
Fred G. Dieterich
ATTORNEYS

UNITED STATES PATENT OFFICE.

RALPH HUMPHRIES, OF VANCOUVER, BRITISH COLUMBIA, CANADA.

FLY-WHEEL.

1,254,694.  Specification of Letters Patent.  Patented Jan. 29, 1918.

Application filed August 7, 1917. Serial No. 184,927.

*To all whom it may concern:*

Be it known that I, RALPH HUMPHRIES, a citizen of the Dominion of Canada, residing at Vancouver, in the Province of British Columbia, Canada, have invented certain new and useful Improvements in Fly-Wheels, of which the following is a specification.

This invention relates to a fly wheel for maintaining the rotational movement of an engine or other mechanism substantially uniform under variations of load or driving effort, and my object has been to design a wheel that when it is at rest or moving at a very low velocity the weight is concentrated near the hub where it will offer but slight resistance to rotation of the wheel when starting, but when the engine or mechanism begins to make up its speed the weight will move as close as practicable to the rim where it will exercise its inertia in maintaining a substantially uniform speed of rotation.

This object is attained by providing a wheel of such form that it will retain within it a weighted fluid, or solid matter in such form that it will act as a fluid and be free to move from the hub to the rim under the influence of centrifugal force and will return by gravity to the hub when the wheel is at rest.

The invention is fully described in the following specification, reference being made to the drawings by which it is accompanied, in which.

Figure 1:
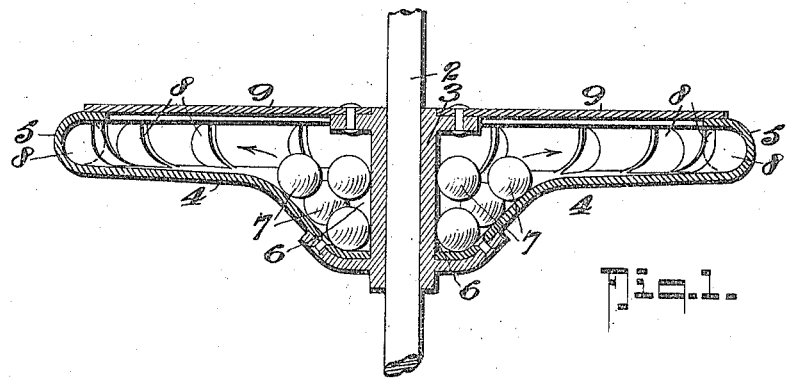
Figure 1 is a vertical section on the line 1—1 in Fig. 2.
Figure 2:
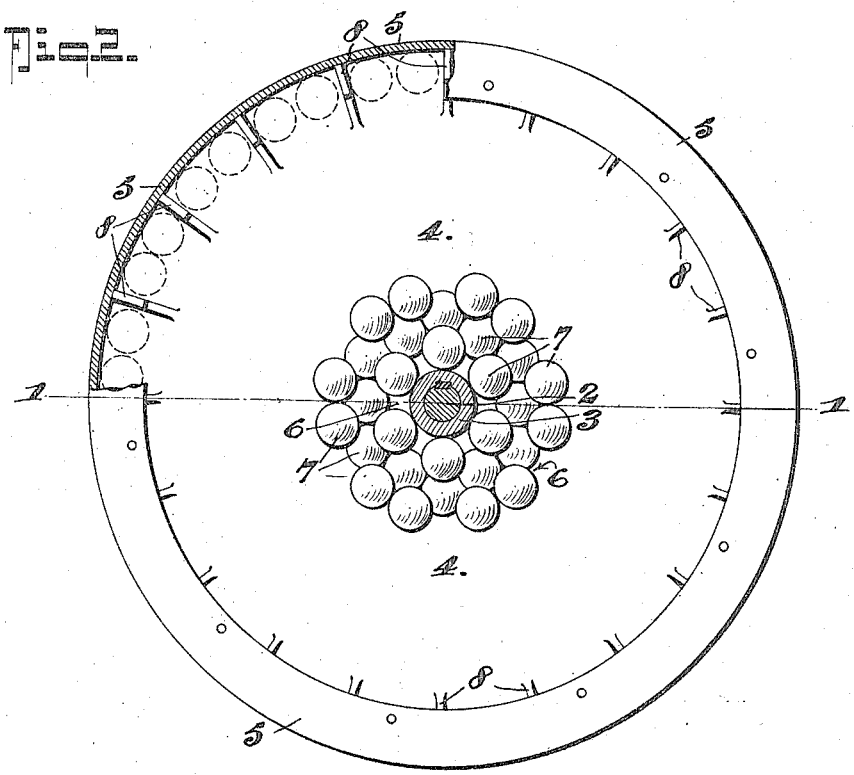
Fig. 2 is a plan with the cover plate removed, a portion of the rim being in section.

In these drawings 2 represents the shaft on which the wheel is mounted, the axis of which shaft is vertically disposed so that the wheel may rotate in a horizontal plane; 3 represents the hub which is keyed or otherwise secured to the shaft, on which hub is strongly secured a wheel 4 preferably stamped from sheet metal. Adjacent the rim the edge of this wheel is upwardly and inwardly turned as at 5 and adjacent the hub has a depression 6 for the reception of a series of metal balls 7 or a fluid.

The inner surface of the wheel 4 between the rim 5 and depression 6 is inclined slightly toward the depression so that the balls or fluid may, when the wheel is at rest, return by gravity to the depression 6.

Within the recurved rim 5 of the wheel, a series of radial partitions 8 are strongly secured to the wheel and to the cover 9, if such cover be used, but these partitions extend only a short distance inward to retain the balls against circumferential movement on the wheel only when they are adjacent the rim of the wheel.

With a wheel so constructed the balls or fluid, when the wheel is at rest, will collect by gravity in the recess 6 adjacent the hub where they will offer but slight resistance to rotation. To rotate the shaft only the inertia of the wheel itself will require to be overcome, the balls being free to remain at rest as the wheel rotates, as there are no radial partitions to carry them with it, but as rotation is imparted to them by frictional contact with the wheel, they will be impelled by centrifugal force toward the rim 5, and as soon as they are disposed around the rim their inertia will be available in maintaining uniform movement of the wheel as they will be checked against circumferential movement by the radial partitions 8.

As the balls are free to move they will respond readily to centrifugal force and will be disposed around the rim at a very slight speed of rotation having only the slight incline to overcome which is designed to return them toward the hub when the wheel comes to rest.

As previously explained, any fluid of sufficient weight, such as quicksilver, water or oil, may be used instead of, or in conjunction with the metal balls. Used in conjunction the fluid will fill the interstices between the balls and will check at the rim the momentum of any of the balls that are late in moving out.

I do not desire to be confined to the particular construction of wheel here set forth as the same may be modified to suit the requirements of construction and of experience without departing from the invention as defined.

Having now particularly described my invention, I hereby declare that what I claim as new and desire to be protected in by Letters Patent, is:

1. A fly wheel, comprising a light hollow wheel body the bottom of the hollow of which is inclined slightly downward from the rim toward the shaft to which it is secured, projections across the hollow adjacent the rim and a mobile material within the hollow that will gravitate toward the hub of the wheel when the wheel is at rest and will move outward to the rim under the action of centrifugal force when the wheel is rotated and will be engaged by the projections at the rim and be impelled to travel with the wheel.

2. A fly wheel, comprising a disk inclined slightly toward the center where it is secured to the shaft and having an upwardly and backwardly recurved rim with projections across the hollow of the rim and a mobile material within the wheel.

3. A fly wheel, comprising a disk of thin sheet metal having an upwardly and backwardly recurved rim with radial partitions across the hollow so formed, and a depression adjacent the center of the disk where it is secured to the shaft, and a material within the depression that is free to move outward against the rim when the wheel is rotated and will be engaged by the radial projections and impelled to travel with the wheel.

4. A fly wheel, comprising a disk of thin sheet metal having an upwardly and backwardly recurved rim and a recess adjacent the center toward which recess the disk is inclined slightly downward, the recurved rim having radial partitions at intervals across the hollow formed by the recurved edge, said disk being secured to the shaft by a hub, and a mobile material within the depression that will move outward to the rim when the wheel is rotated and engage the radial partitions therein.

5. A fly wheel, comprising a thin light disk having an upwardly and backwardly recurved rim and a depression adjacent the hub by which the disk is secured to the shaft, said recurved rim having radial projections across the hollow formed by the recurved edge and a series of metal balls in the depression that will move outward against the rim under the action of centrifugal force when the wheel is rotated and will engage the radial projections of the rim and be impelled to travel with the wheel.

In testimony whereof I affix my signature.

RALPH HUMPHRIES.

Copies of this patent may be obtained for five cents each, by addressing the "Commissioner of Patents, Washington, D. C."